Feb. 24, 1925.

J. RUTHS ET AL

CONTROLLING APPARATUS

Filed Nov. 29, 1922

Inventors:
J. Ruths
N. Persson
C. G. Janson
S. M. Backstrom
By Marker Clerk
Attys Patented Feb. 24, 1925.

1,527,275

UNITED STATES PATENT OFFICE.

JOHANNES RUTHS, OF DJURSHOLM, NILS PERSSON, OF LIDINGO-BREVIK, AND CARL GUSTAF JANSON AND SIGURD MATTIAS BÄCKSTRÖM, OF STOCKHOLM, SWEDEN, ASSIGNORS TO AKTIEBOLAGET VAPORACKUMULATOR, OF STOCKHOLM, SWEDEN, A CORPORATION OF SWEDEN.

CONTROLLING APPARATUS.

Application filed November 29, 1922. Serial No. 604,111.

*To all whom it may concern:*

Be it known that we, JOHANNES RUTHS, NILS PERSSON, CARL GUSTAF JANSON, and SIGURD MATTIAS BÄCKSTRÖM, subjects of the King of Sweden, residing at, respectively, Djursholm, Lidingo-Brevik, Stockholm, and Stockholm, Sweden, have invented certain new and useful Improvements in Controlling Apparatus, of which the following is a specification.

Our invention relates to regulating mechanism and more particularly to valve control wherein a single valve is controlled by a plurality of independent agencies.

In a number of plants, particularly such as are provided with heat storers, controlling members, for instance valves, are often to be found, said valves being adapted to be actuated by a number of impulses independent of each other and originating for example from pressures, speeds or temperatures. By the word "impulse" we mean a force which is a function of a condition in that which is to be controlled. The impulse is, in fact, a measure of the condition and is used to actuate a mechanism so that the mechanism moves responsively to changes in condition in that which is to be controlled. The members may be actuated directly or indirectly by conditions relating to the medium to be controlled. As herein used the word "direct" designates that type of actuation wherein movement of parts is effected by means of mechanical parts as rods, levers, etc., whereas the word "indirect" designates that type of actuation wherein movement is effected through the intermediary of a fluid such as water or oil. The last arrangement, the indirect, is the most common, as it is then possible to attain greater force for adjusting the regulating member, and a more accurate and sensitive control.

Such indirect control is usually effected so that the impulses actuate a slide valve which controls the supply and outlet of a pressure liquid to and from an auxiliary- or servo-motor which, in turn, adjusts the regulating member, or, if a great accuracy in the control is required, the impulses are each first caused to act on a separate so-called relay, which relays then in turn indirectly actuate one or more devices, such as slide valves which, in turn, indirectly operate the servo-motor.

In the event that the controlling apparatus is actuated indirectly by means of a pressure liquid the influence of the impulse on the relay is thus transmitted hydraulically to a slide valve, which, in turn, controls the pressure liquid which operates the servomotor so as to consequently adjust the controlling member. The number of relays heretofore employed corresponded to the number of impulses intended to indirectly actuate the controlling member. This makes the arrangement expensive and renders the attendance thereof highly complicated.

The manner in which these impulses act in the controlling apparatus, may be entirely different, for instance, it may be desired that the main controlling member of the apparatus shall open if one of the impulses tends to open the same, independently of the tendency of one of the other impulses to close the controlling member. In other cases it is desirable that the member shall close if one of the impulses tends to close the same independently of the tendency of another impulse to cause opening of the member. It frequently occurs in steam plants having steam storers that a certain impulse such as a maximum pressure in the storer actuates a valve to close the same and to keep it closed regardless of the occurrence of other impulses tending to open the same. On other occasions the member has to open under all circumstances on a certain value having been attained, such as the lowest speed permissible in any machine, and so forth.

The present invention has for its object to simplify the above-mentioned controlling apparatus in which a plurality of relays are used for corresponding impulses and the invention consists generally of the combination with a main controlling member with means such as a servomotor for regulating the position of the member, means such as a slide valve for indirectly actuating the regulating means and a single device or relay responsive to a plurality of impulses for indirectly controlling the operation of the actuating means, in such a manner that one impulse may move the main control member in one direction regardless of the tendency of another impulse to move the main controlling member in another direction and regardless of relative values of the impulses, so that one impulse predominates over another.

More particularly the invention embraces the provision in a relay of a movable part which is responsive to a plurality of impulse receiving elements for indirectly controlling the operation of the actuating means and also in the resilient mounting of certain of the impulse receiving elements.

The present invention further comprises a novel relay for use in regulation of the above described kind.

The invention also consists of a controlling apparatus embodying means for transmitting pressure, speed responsive and temperature impulses to the movable part of the relay.

Other objects as well as the nature, characteristic features and scope of the invention will be more readily apparent from the following description taken in connection with the drawings and pointed out in the claims forming a part of this specification.

This invention is clearly illustrated in the acccompanying drawings, in which:—

Similar characters of reference are employed in all of the above described views to indicate corresponding parts.

Figure 1:
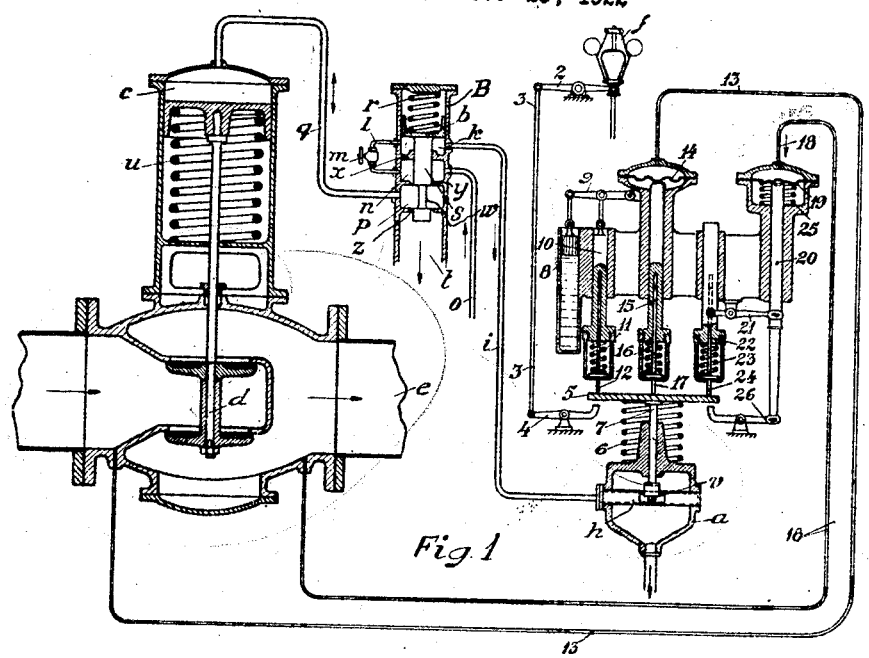
Fig. 1 is a diagrammatic view of the controlling apparatus.

In Fig. 1, $a$ denotes a relay on which, according to the invention, a plurality of impulses originating in various conditions are caused to act in a manner to be described hereinbelow. B designates what we term an "actuating means" comprising a piston $b$ connected with a slide valve and actuated by a spring, and $c$ is a servo-motor operating the main control member, in the embodiment shown, a valve $d$ which is inserted in a conduit $e$.

Arranged in the relay $a$ is a pipe $h$ provided with an outlet opening $v$, through which a continuously flowing stream of liquid such as oil or water issues and is controlled by a throttling member attached to a relay arm and operated in a manner more fully described below. The pipe $h$ is connected by means of the conduit $i$, with the chamber $k$ underneath the piston $b$, said chamber $k$ being, in turn, connected with the chamber $n$ by means of the conduit $l$ provided with the throttling device $m$, pressure liquid being continuously supplied to the chamber $n$ through the conduit $o$. The chambers $k$ and $n$ are separated by the partition $x$ having the slide valve $s$ extending therethrough. Slide valve $s$ is shaped with a groove or recess $w$, which, in the embodiment shown, is made by cutting away a part of the slide valve co-extensive with chamber $p$ to a smaller dimension than the remainder of the slide valve. The chamber $p$ communicates with the auxiliary- or servo-motor $c$ by means of the conduit $q$. The chamber $p$ is separated from the chamber $n$ by the partition $y$ and from the outlet $t$ by the partition $z$.

The operation is as follows: Assume that one of the impulses (in a way to be described hereinbelow) actuates the relay $a$ in such manner that the outlet opening $v$ is increased so as to increase the amount of liquid flowing out of the chamber $k$. As the amount of liquid supplied to this chamber by the conduits $l$ and $o$ and chamber $n$ is limited by the throttling device $m$, the pressure in the chamber $k$ will sink so that the piston $b$ moves downward through the influence of the spring $r$. The downward movement of piston $b$ causes a downward movement of slide valve $s$, placing the groove $w$ opposite partition $z$ so that liquid may pass from chamber $p$ to the outlet $t$. Pressure liquid will then flow out through the conduit $q$ from the servo-motor $c$, the piston of which then moves upwards, on account of the pressure of the spring $u$, so as to close the valve $d$.

On the other hand, should any of the impulses (in a way to be described hereinbelow) actuate the relay $a$ so that the outlet opening $v$ would be decreased, whereby a rise in the pressure in the chamber $k$ occurs, the piston $b$ will move upwards, which is also the case with the slide valve $s$ which then admits pressure liquid from the chamber $n$ to the chamber $p$, such pressure liquid being thus supplied to the servo-motor $c$ through the conduit $q$. Consequently, the pressure will rise in the servo-motor, and the piston of the motor is displaced downwardly so as to open the valve $d$.

The relay $a$, on which the impulses are caused to act in accordance with the present invention, will now be described.

The speed governor $f$ is adapted to actuate a movable part, in this instance an arm 5 from below by means of the lever 2, the rod 3 and the lever 4 so that, should the speed increase, the lever 4 will move the arm 5 upwardly. The said arm 5, which is also actuated upwardly by the spring 6, will vary the size of the outlet opening $v$ by means of the rod 7, according to the movement thereof in one or the other direction. A temperature regulator 8 consisting of a thermostat or the like, may influence the arm from above by means of the lever 9, the sleeve 10, the spring 11 and the pin 12 which is slidably mounted in the sleeve 10.

The device is constructed so that the spring 11 is stiffer than the spring 6 so that, if for instance the sleeve 10 is moved downwardly through the influence of the temperature regulator 8 on rising temperatures, the spring 11 will not, or practically not, be compressed, spring 6 being compressed instead, whereby the arm 5 with the rod 7 is moved downwardly.

Moreover, a pressure (consisting in this case of the pressure before the valve $d$) may act through the pipe 13 for example on a diaphragm 14, which diaphragm may, on a rise of the pressure, move the sleeve 15, the spring 16 and the pin 17 slidably mounted within the sleeve 15, such diaphragm also moving the arm 5 downwardly on account of the fact that the spring 16 is made stiffer or stronger than the spring 6.

Through the pipe 18, another pressure (in this case the pressure behind the valve $d$) acts on the diaphragm 19, which actuates the pin 24, which is slidably mounted in the sleeve 22, by means of the rod 20, the lever 21, the sleeve 22 and the spring 23. By reason of the upwardly directed pressure of the spring 25 on the diaphragm 19, the arm 5 may be moved downwardly by pin 24 on a falling pressure in pipe 18. The rod 20 is extended so that on a rising pressure on the diaphragm 19 beyond a certain limit, the arm 5 will be raised by means of the lever 26. If then any one of the other impulses, for instance the impulse originating in the temperature regulator, would tend to move the arm 5 downwardly, the arrangement is such that corresponding spring, in this case spring 11, will be compressed so that the above-mentioned pressure impulse, that is to say the pressure on the diaphragm 19, will be determinative of the regulation on account of the rigid system acting on the arm. Conditions will be the same if any one of the other impulses acting above the arm would tend to move the arm 5 downwardly and any one of the impulses acting under the arm would then tend to move the arm upwardly. That is to say, the impulses acting from below will always be decisive should they tend to regulate.

If the arm 5 with the rod 7 is moved downwardly, the outlet opening $v$ is decreased so as to cause a rise of the pressure in the chamber $k$, such rise of the pressure resulting in the valve $d$ being opened, or opened more, as previously described.

If, again, the arm is moved upwardly, the outlet opening $v$ is increased so that the pressure in the chamber $k$ will fall which, as described hereinabove, results in the valve $d$ being closed, or more nearly closed.

It will be seen from the above that if the speed governor or the pressure prevailing on the diaphragm 19 does not actuate the arm 5 from below so that the valve is closed, or more nearly closed, any one of the impulses acting above the arm 5 may control the valve, said control being such that if any one of these impulses tends to open the valve, it is able to open or more fully open, even if any of the other of these impulses acting from above would tend to close the valve. That the impulses acting below the arm will always be decisive should any of these impulses tend to close the valve, is rendered possible, as stated above, by these impulses being caused to influence the arm 5 through a rigid system, whereas the impulses acting above the said arm influence the latter by means of a resilient system.

If it be assumed, for example, that the pressure before the valve $d$ rises, this will influence the diaphragm 14; the diaphragm 14 moves downwardly and by the intermediary of the sleeve 15, the spring 16, and the pin 17, the arm 5 is moved downwardly and the valve $d$ is opened, provided of course that none of the impulses acting from below tends to close the valve by pressing the arm 5 upwardly.

If namely, to take an example, the pressure behind the valve, which influences the diaphragm 19, would now have a maximum value, or rise to such value, the arm cannot be moved downwardly, or if it be moved downwardly, it is again forced upwardly so that the valve will then again be closed, as described above. By changing the lengths of the pins or rods pertaining to the various impulses, the regulation may be adjusted to different values.

It will appear from above that the valve opens in the present case should the pressure before the same rise beyond a certain value, which takes place independently of whether the pressure behind the valve would rise on this occasion, provided such latter pressure has not attained a certain limiting value: likewise, it will open if the pressure behind the same would fall independently thereof whether the pressure before the valve would then fall and thus tend to close the valve.

As is readily apparent the action of the predominating impulse is absolute and positive regardless of the relative values of the impulses, for example, the relative pressure on the two sides of the main control member; the action is absolute regardless of the absolute value of the impulse which is overcome. The action of the pressure behind the valve in closing or opening the same is not affected by the pressure before the valve, through all ranges of this latter pressure.

It will be seen from the above that an unlimited number of impulses may be provided and that all conceivable combinations for the control of the valve may be carried out according to this principle.

Figure 2:
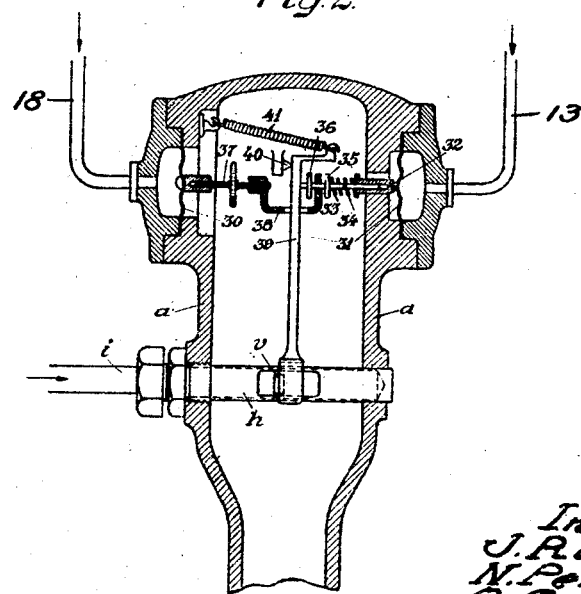
Fig. 2 is a vertical sectional view of a practical embodiment of the single relay.

Fig. 2 illustrates another embodiment of the relay $a$. In this embodiment, the main controlling member or valve $d$ of Fig. 1 is to be controlled by two pressures, so that the member shall always open if any one of the pressure impulses tends to open the same, but in case the one pressure has attained a certain maximum value, the valve is to remain closed or be closed.

Two pressures act on the diaphragms 30 and 31 adapted to actuate the arm 39 by means of the sleeve 32, the spring 33 and the pin 34 slidably arranged within the sleeve 32 and provided with the adjustable abutments 35 and 36, as well as by means of the bracket 38 the length of which is adapted to be adjusted by the screw 37, the outlet opening $v$ being thus changed by the arm 39. The arm 39 abuts against the fixed support 40 and is retained in contact therewith and also in contact with the pin 34 by the spring 41.

The bracket 38 is attached to the diaphragm 30 by means of the screw 37, whereas the sleeve 32 is in loose contact with the diaphragm 31.

The pressures acting on the diaphragms 30 and 31 are effective, because of the resiliency of the diaphragms.

It is assumed that the pipe $h$ having the outlet opening $v$ provided therein is in communication with the chamber $k$ (Fig. 1), as described hereinabove; if the outlet opening is then increased for some reason or other, the valve $d$ will thus be closed, as previously described, but if this opening is decreased, the said valve will open more or less, according to such decrease.

The device operates in the following manner:

It is assumed that the pressure on the diaphragm 31 is increased for some reason or other, which results in the sleeve 32 being moved to the left. Now, the spring 33 is constructed so as to overcome the spring 41, by reason of which the pin 34 is also moved to the left and the arm 39 is forced to turn about the fixed support 40 so that the opening $v$ is decreased, which, as previously described, results in the valve $d$ being somewhat opened. Thus the valve will in this case open if the pressure on the diaphragm 31 rises beyond a certain value and, consequently, the valve $d$ may serve as a so-called over-flow valve. By reason of the motion between the abutments 35 and 36 and the bracket 38 it is evident that the pressure acting on the diaphragm 31 may regulate the valve within wide limits, independently of the pressure acting on the diaphragm 30.

If the pressure on the diaphragm 30 falls, the bracket 38 is moved to the left on account of the recoiling of the diaphragm; if the pressure falls so far that the bracket 38 strikes against the abutment 36, the pin 34 sliding loosely within the sleeve 32 will be moved to the left, and the opening $v$ will be decreased, which results in the valve $d$, Fig. 1, opening more or less, according to the decrease of the opening $v$.

In such case the valve $d$ will consequently operate as a reducing valve and will always open should the pressure on the diaphragm 30 fall below a certain value, independently of the pressure on the diaphragm 31.

Again, if the pressure on the diaphragm 30 rises to such a value that the bracket 38 is moved to the right so as to strike the abutment 35, this will result in the spring 33 being compressed, and the pin 34 being moved to the right, which causes the opening $v$ to increase and the valve $d$ to close, entirely independently thereof whether the pressure on the diaphragm 31 would at the same time tend to move the pin in the opposite direction so as to open the valve.

By reason of the abutments 35 and 36 being adjustable on the pin 34 and owing to the length of the bracket 38 being adapted to be altered with the aid of the left- and right-handed screw 37, an adjustment of the control is rendered possible within wide limits.

What we claim as new and desire to secure by Letters Patent of the United States is:

1. In a control apparatus adapted to be influenced by separate impulses, the combination of a main control member, liquid pressure operated means to regulate the position of said member, liquid pressure operated means to control the operation of said first mentioned means, separate streams of liquid under pressure for operating each of said means and a single device responsive to a plurality of impulses for indirectly controlling the operation of the actuating means.

2. In a control apparatus adapted to be influenced by a plurality of impulses, the combination of a conduit, a valve in said conduit, a liquid pressure operated servo-motor to actuate said valve, an actuating means, a relay, two streams of liquid, one passing from said actuating means to said servo-motor and controlled by said actuating means, the other passing from said actuating means to said relay and controlled by said relay, an arm associated with said relay, a plurality of mechanisms associated with said arm, each responsive to a separate impulse.

3. In a control apparatus adapted to be influenced by a plurality of impulses, the combination of a main control member, liquid pressure operated means to control said member, actuating means for indirectly actuating the first mentioned means, a single arm to control the second mentioned means, a rigid mechanism adapted to move said arm, a second mechanism adapted to move said arm, said second mechanism having two parts and a spring arranged between said parts.

4. In a control apparatus adapted to be influenced by separate impulses, the combination of a main control member, a liquid pressure operated servo-motor to control the position of said control member, liquid pressure operated means to control said servo-motor, a relay to control said liquid pressure operated means, an arm associated with said relay actuated by a plurality of impulses, means for effecting the movement of said arm by one impulse in one direction and, at the same time, overcoming the tendency of another impulse to move the arm in another direction independent of absolute values of the impulse which is overcome, so that the first impulse predominates over the second impulse.

5. In a control apparatus adapted to be influenced by a plurality of impulses, the combination of a main control member, liquid pressure operated means to control the operation of said main control member, a second liquid pressure operated means to control said first mentioned means, said second means comprising a slide valve, chambers associated with said slide valve, a continuous throttled connection between two of said chambers and a spring acting on said slide valve, a relay to control said second means, an arm associated with said relay, separate mechanisms, each operated by a separate impulse and acting independently on said arm.

6. In a control apparatus adapted to be influenced by a plurality of impulses, the combination of a main control member, liquid pressure operated means to control the position of said member, a second liquid pressure operated means to control said first means, a relay, a continuous stream of liquid flowing from said second means to said relay, an arm controlling said stream and a plurality of impulses acting on said arm.

7. In a control apparatus adapted to be influenced by a plurality of impulses, the combination of a main control member, means for regulating the position of said member, a second means for indirectly actuating the regulating means, said second means including two parts adapted, under certain conditions to move together and under other conditions to have relative movement.

8. In a control apparatus adapted to be influenced by a plurality of impulses, the combination of a conduit, a valve in said conduit, a single device to indirectly control said valve, means operating on said device to regulate the valve in response to the pressure in said conduit in front of said valve and means operating on said device to open said valve when the pressure in said conduit behind said valve falls below a predetermined value even when said first means tends to close the valve and independent of absolute pressures in front of the valve.

9. In a control apparatus adapted to be influenced by a plurality of impulses, the combination of a conduit, a valve in said conduit, a liquid pressure operated servo-motor to control said valve, liquid pressure operated actuating means to control flow of liquid to said servo-motor, a single device to control the pressure in said actuating means, means operating on said device to regulate the valve in response to the pressure in said conduit in front of said valve and means operating on said device to open said valve when the pressure in said conduit behind said valve falls below a predetermined value even when said first means tends to close the valve and independent of absolute pressures in front of the valve.

10. In a control apparatus adapted to be influenced by a plurality of impulses, the combination of a conduit, a valve in said conduit, a liquid pressure operated servo-motor to control said valve, liquid pressure operated actuating means to control flow of liquid to said servo-motor, a single device to control the pressure in said actuating means, means operating on said device to regulate the valve in response to the pressure in said conduit in front of said valve and means operating on said device to close said valve when the pressure in said conduit behind said valve rises above a predetermined value even when said first means tends to close the valve and independent of absolute pressure in front of the valve.

11. In a control apparatus adapted to be influenced by a plurality of impulses, the combination of a conduit, a valve in said conduit, a single device to indirectly control said valve, means operating on said device to regulate the value in response to the pressure in said conduit in front of said valve and means operating on said device to close said valve when the pressure in said conduit behind said valve rises above a predetermined value even when said first means tends to open the valve and independent of absolute pressures in front of the valve.

12. In a control apparatus adapted to be influenced by a plurality of impulses, the combination of a conduit, a valve in said conduit, a single device to indirectly control said valve, means operating on said device to regulate the valve in response to the pressure in said conduit in front of said valve, means operating on said device responsive to the pressure behind said valve and means operating on said device responsive to a speed.

13. In a control apparatus adapted to be influenced by a plurality of impulses, the combination of a conduit, a valve in said conduit, a single device to indirectly control said valve, means operating on said device to regulate the valve in response to the pressure in said conduit in front of said valve, means operating on said device responsive to the pressure behind said valve and means operating on said device responsive to a temperature.

14. In a control apparatus, adapted to be influenced by a plurality of impulses, the combination of a conduit, a valve in said conduit, a liquid pressure operated servo-motor controlling said valve, liquid pressure operated actuating means to control the servo-motor, relay mechanism to control the actuating means, means responsive to the pressure in said conduit in front of the valve to actuate said mechanism, means responsive to the pressure behind said valve to actuate said mechanism independently of the pressure before the valve and a speed responsive device adapted to actuate said mechanism.

15. In a control apparatus adapted to be influenced by a plurality of impulses, the combination of a main control member, a servo-motor to control said member, actuating means to control said servo-motor, a relay to control said actuating means, a fluid communication between said actuating means and said relay, and a single device responsive to a plurality of impulses associated with said relay.

16. In a control apparatus adapted to be influenced by a plurality of impulses, the combination of a main control member, a liquid pressure operated servo-motor to control said member, liquid pressure operated actuating means to control the passage of liquid to and return from said servo-motor, a single mechanism to control said actuating means responsive to a plurality of impulses.

17. In a control apparatus adapted to be influenced by a plurality of impulses, the combination of a main control member, liquid pressure operated means to control said member, a grooved slide valve to control the passage of liquid to said means, a relay to control liquid to actuate said slide valve, said relay comprising a single arm actuated by a plurality of impulses.

18. In a control apparatus, adapted to be influenced by a plurality of impulses, the combination of a main control member, a cylinder, a piston in said cylinder, liquid pressure actuating means to actuate said piston, a single member responsive to a plurality of impulses to control said actuating means.

19. In a control apparatus adapted to be influenced by a plurality of impulses, the combination of a conduit, a valve in said conduit, a liquid pressure operated servo-motor to control said valve, liquid pressure operated actuating means to control said servo-motor, a relay, a continuous stream of liquid flowing from said actuating means through said relay, a single arm controlling the said stream, mechanism responsive to a plurality of impulses acting on said arm to regulate the valve by the pressure in front thereof and to open the valve when the pressure behind the valve falls below a predetermined value, means to close the valve by the pressure behind the valve when the pressure before tends to open the valve.

20. A relay for control apparatus comprising an arm, a spring acting to move the arm in one direction, a pin acting on said arm, a sleeve for said pin, means to effect relative movement of said pin and sleeve, a pressure responsive device adapted to move said sleeve, a mechanism responsive to another pressure acting on said arm and adapted at certain times to oppose and overcome the action of the pin on the arm.

21. A relay for control apparatus comprising an arm, a spring acting to move the arm in one direction, a pin acting on said arm, a sleeve for said pin, means to effect relative movement of said pin and sleeve, a pressure responsive device adapted to move said sleeve, a mechanism responsive to another pressure acting on said arm and adapted at certain times to oppose and overcome the action of the pin on the arm and a continuously flowing stream of liquid controlled by said arm.

22. A relay for control apparatus comprising an arm, a spring acting to move the arm in one direction, a pin acting on said arm, a sleeve for said pin, means to effect relative movement of said pin and sleeve, a pressure responsive device adapted to move said sleeve, a mechanism having parts positioned on both sides of said arm and adapted to move the arm in both directions.

23. A relay for control apparatus comprising an arm, resilient means adapted to move the arm in one direction, mechanism responsive to pressure adapted to actuate the arm in another direction, mechanism responsive to pressure adapted to move the arm in both directions, and means whereby the latter mechanism overcomes the action of the first mechanism.

24. A relay for control apparatus comprising an arm, resilient means adapted to move the arm in one direction, mechanism responsive to pressure adapted to actuate the arm in another direction, mechanism responsive to pressure adapted to move the arm in both directions, and means whereby the latter mechanism overcomes the action of the first mechanism and a continuously flowing stream of liquid controlled by said arm.

25. A relay for control apparatus comprising an arm, resilient means adapted to move the arm in one direction, mechanism adapted to move the arm in another direction, mechanism adapted to move the arm in both directions, a plurality of diaphragms each responsive to a separate pressure impulse acting on said mechanisms.

26. A relay for control apparatus comprising an arm, resilient means adapted to move the arm in one direction, mechanism adapted to move the arm in another direction, mechanism adapted to move the arm in both directions, a plurality of diaphragms each responsive to a separate pressure impulse acting on said mechanisms and a continuously flowing stream of liquid controlled by said arm.

27. A relay for control apparatus comprising an arm, mechanism actuated by an impulse to move the arm and regulate the position of the same, a second mechanism responsive to a second impulse normally inactive but adapted to overcome the first mechanism and control the position of the arm for extreme values of the second impulse.

28. A relay for control apparatus comprising an arm, mechanism actuated by an impulse to move the arm and regulate the position of the same, a second mechanism responsive to a second impulse normally inactive but adapted to overcome the first mechanism and control the position of the arm for extreme values of the second impulse, and a continuously flowing stream of liquid controlled by said arm.

29. A relay for control apparatus comprising, an arm, a plurality of mechanisms each responsive to a separate impulse acting on said arm, means whereby one of said mechanisms can always move said arm in one direction regardless of the tendency of a second mechanism to move the arm in the opposite direction and regardless of absolute values of the impulse to which the second mechanism is responsive.

30. A relay for control apparatus comprising, an arm, a plurality of mechanisms each responsive to a separate impulse acting on said arm, means whereby one of said mechanisms can always move said arm in one direction regardless of the tendency of a second mechanism to move the arm in the opposite direction and regardless of absolute values of the impulse to which the second mechanism is responsive and a continuously flowing stream of fluid controlled by said arm.

31. In a control apparatus, a main control member, a relay to indirectly control said main control member, a continuously flowing stream of liquid in said relay and a single movable part responsive to a plurality of impulses to throttle said continuously flowing stream of liquid.

32. In a control apparatus adapted to be influenced by a plurality of impulses, a conduit, a valve in said conduit, means to regulate the valve responsive to the pressure in the conduit in front of the valve, means responsive to the pressure in the conduit behind the valve to close said valve when said pressure behind the valve rises above a predetermined value even when the first means tends to open the valve and independent of absolute pressures in front of the valve and means responsive to the pressure in the conduit behind the valve to open said valve when said pressure behind the valve falls below a predetermined value even when said first means tends to close the valve and independent of absolute pressures in front of the valve.

33. In a control apparatus adapted to be influenced by a plurality of impulses, a conduit, a valve in said conduit, means to control the valve responsive to the pressure in the conduit in front of the valve, means to control the valve responsive to the pressure behind said valve and means responsive to the pressure in the conduit behind the valve to close said valve when the said pressure behind said valve rises above a predetermined value even when the first means tends to open the valve and independent of absolute pressures in the conduit in front of the valve.

34. In a control apparatus the combination of a main control member, means for regulating the position of said member, means for actuating the regulating means, a relay to control said actuating means, a movable part associated with said relay, and a plurality of mechanisms each responsive to a separate impulse acting on said movable part, one of said mechanisms being made of two parts, one of which is movable relative to the other and resilient means interposed between said two parts.

35. In a control apparatus adapted to be influenced by a plurality of impulses, the combination of a main control member, liquid pressure operated means to control said member, actuating means for indirectly actuating the first mentioned means, a single arm to control the second mentioned means, a rigid mechanism adapted to move said arm, a second mechanism adapted to move said arm, said second mechanism having two parts and a resilient means arranged between said parts.

In testimony whereof we affix our signatures in presence of two witnesses.

JOHANNES RUTHS.
NILS PERSSON.
CARL GUSTAF JANSON.
SIGURD MATTIAS BÄCKSTRÖM.

Witnesses:
ERIC HALGER,
NILS HANSON.